United States Patent [19]
Greef et al.

[11] Patent Number: 5,897,639
[45] Date of Patent: Apr. 27, 1999

[54] ELECTRONIC CATALOG SYSTEM AND METHOD WITH ENHANCED FEATURE-BASED SEARCH

[76] Inventors: Arthur Reginald Greef, 19 Madison Ave., Valhalla, N.Y. 10595; Steffen Michael Fohn, 3 Cornwell St., Poughquag, N.Y. 12570; Thomas Robert Maguire, 3 Coventry La., Brewster, N.Y. 10509; Ajit Singh, 896 Eglinton Avenue East, Apt. 108, Toronto, Ontario, Canada, N4G 2L2

[21] Appl. No.: 08/725,961

[22] Filed: Oct. 7, 1996

[51] Int. Cl.⁶ .................................................. G06F 17/30
[52] U.S. Cl. ......................... 707/103; 707/102; 707/513; 707/3; 705/26; 705/27
[58] Field of Search ...................... 707/103, 5, 3, 707/102, 513; 395/683, 62; 364/237.2, 237.3, 282.1, 283.4, 283.3; 345/433; 705/26, 27

[56] References Cited

U.S. PATENT DOCUMENTS

| | | | |
|---|---|---|---|
| 4,774,655 | 9/1988 | Kollin et al. | 364/200 |
| 4,775,935 | 10/1988 | Yourick | 364/401 |
| 4,803,642 | 2/1989 | Muranaga | 364/513 |
| 5,528,490 | 6/1996 | Hill | 364/403 |
| 5,561,740 | 10/1996 | Barrett et al. | 395/62 |
| 5,584,035 | 12/1996 | Duggan et al. | 395/800 |
| 5,598,557 | 1/1997 | Doner et al. | 707/5 |
| 5,600,829 | 2/1997 | Tsatalos et al. | 707/2 |
| 5,630,125 | 5/1997 | Zellweger | 707/103 |
| 5,634,128 | 5/1997 | Messina | 395/682 |
| 5,664,208 | 9/1997 | Pavley et al. | 395/777 |
| 5,675,784 | 10/1997 | Maxell et al. | 707/100 |
| 5,680,452 | 10/1997 | Shanton | 380/4 |
| 5,740,425 | 4/1998 | Povilus | 707/100 |

Primary Examiner—Paul V. Kulik
Assistant Examiner—Jean M. Corrielus
Attorney, Agent, or Firm—Morgan & Finnegan LLP

[57] ABSTRACT

The present invention is an catalog database system and method in which there are a plurality of catalog objects. Each catalog object contains at least one attribute and at least some of the catalog objects have at least one search path leading to at least one other object. A first object and the attributes of other objects in the electronic catalog are displayed. Those attributes which are defined in the first object and inherited to all descendant objects which are in any search path leading from the first object are displayed as strongly relevant attributes. Those attributes which are defined in at least one object which is in any search path leading from the first object are displayed as weakly relevant attributes. Those attributes which are contained in no objects which are in any search path leading from the first object are displayed as irrelevant attributes. To access a catalog object, a selection of an attribute or attribute value from among those displayed is accepted from a user. A search path from the first object to a second object, in which the selected attribute is defined, is followed and the second object is displayed.

13 Claims, 6 Drawing Sheets

ELECTRONIC CATALOG SYSTEM AND METHOD WITH ENHANCED FEATURE-BASED SEARCH

FIELD OF THE INVENTION

The present invention relates to a system and method for enhancing feature-based searches through feature relevance reasoning based on defined and inherited attributes of database objects.

BACKGROUND OF THE INVENTION

The increasing interest in the use of electronic media for product sales has created a need for product search strategies that are intuitive and easy to use. Most electronic catalogs provide some form of search functionality. This may be as simple as a keyword search. The search statement "find all products with the characters 'MP004' in their part number descriptions" is an example of a keyword search. More complex searches, such as parametric searches, are also common. The search statement "find all products which have the parameter 'color' equal to 'red'" is an example of a parametric search. However, problems arise with such search methods.

Current search methods require that parameter relevance be embedded in the description of a product. This is typical in a relational database implementation, in which the database architect is forced to parameterise all notions in a product domain. For example, assume the notion of color is relevant to all computer products in a database. A relevant notion is one that a person searching for a product will always use in order to search for the particular product desired. If the notion is not parameterised, there is no way to enforce entry of information descriptive of the notion. In the example, assume a free-form text field is provided for the description of the computer. With such a field, there is no way to ensure that each entry contains a description of the color of the computer. The notion of color must be parameterised. A separate field must be created which requires that a value be entered.

It is easy to detect parameterisation by considering the different values assigned to attributes. If the values are diametric, for example, yes/no, includes/doesn't include, available/not available, 5"/6"/no inches, then the catalog architect is using parameter values to represent relevance. By building representations of this nature, the architect is attempting to capture when a feature of a component is relevant to a product and when it is not relevant. For example, assume there are two cameras in a catalog, one with autofocus and one without. To capture the fact that this feature is relevant to only one of the cameras, the positive and negative notions of this feature must be parameterised. An attribute such as "autofocus" must be created and given the value "yes" for one camera and the value "no" for the other camera.

Encoding relevance in this manner is difficult to create and maintain. Each time a feature is represented, the catalog architect must determine values for the attribute, which represents the feature, that not only describe the actual feature, but also describe the relevance of the feature to the product.

SUMMARY OF THE INVENTION

The present invention is a catalog database system and method in which there is a plurality of catalog objects. Each catalog object contains at least one attribute and at least some of the catalog objects have at least one search path leading to at least one other child object. A first object and the attributes of other objects in the electronic catalog are displayed. Those attributes which are defined in the first object and relevant to all child objects whose values are assigned in any search path leading from the first object, are displayed as strongly relevant attributes. Those attributes which are defined in and relevant to at least one child object, which is in any search path leading from the first object, are displayed as weakly relevant attributes. Those attributes which are defined in and relevant to no child objects, which are in any search path leading from the first object, are displayed as irrelevant attributes. To access a catalog object, a selection of an attribute from among those displayed is accepted from a user. A search path from the first object to a second object, in which the selected attribute is defined, is followed and the second object is displayed.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention uses the characteristics of object-centered data representation to reason about feature (attribute) relevance. The only descriptions required are of the features relevant to each product or category of product and the actual values of those features. This allows the creation of smaller, simpler catalog databases that are easier to maintain.

Three definitions of relevance are used in the present invention. Strongly relevant features are those features that are relevant to all possible search paths in the feasible search space. Weakly relevant features are those features that are relevant to at least one possible search path. Irrelevant features are those that are not relevant to any search path.

Figure 1:
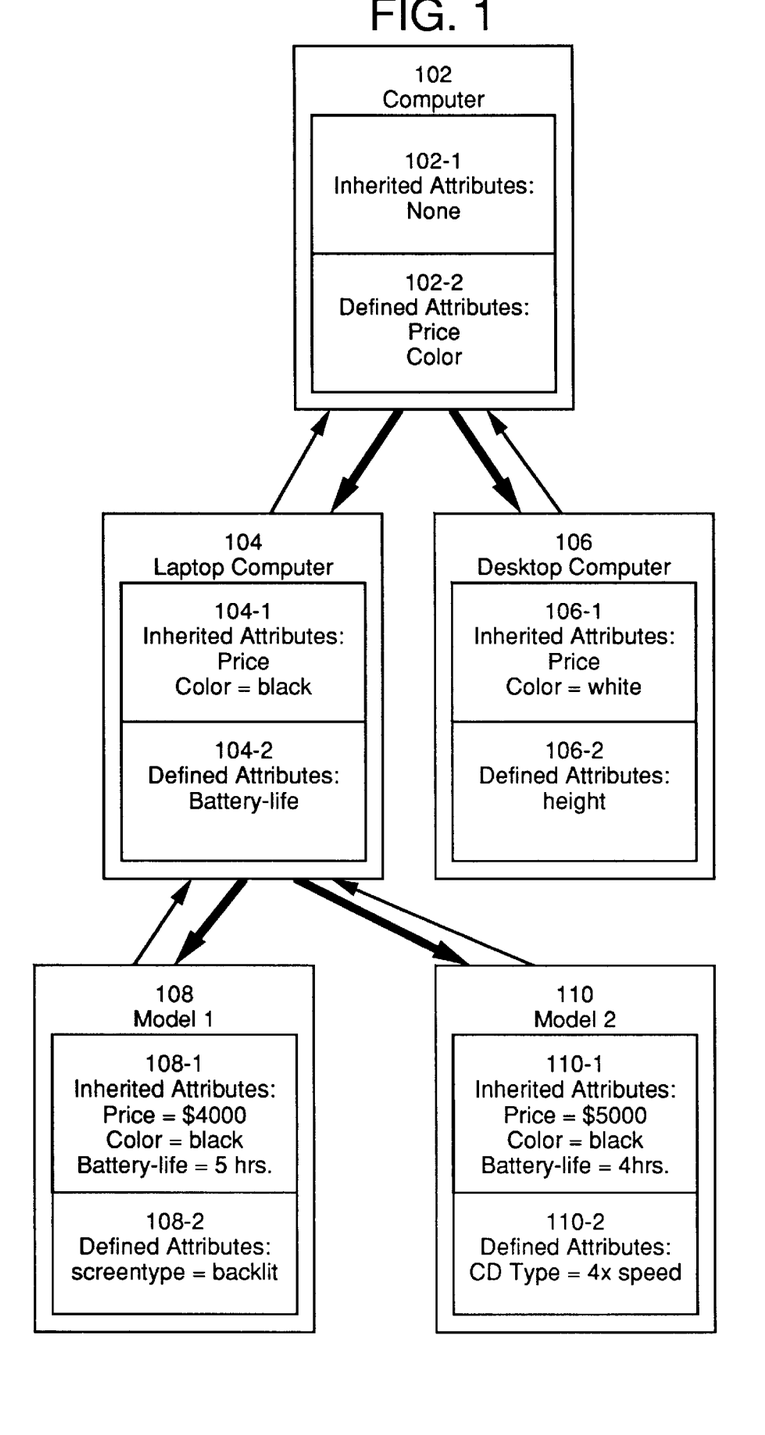
FIG. 1 is an exemplary hierarchical diagram of catalog objects, in accordance with the present invention, showing membership of objects in the hierarchy.

FIG. 1 is a hierarchical diagram of catalog objects, showing ancestry of objects in the hierarchy. In this example, the catalog objects form an object-centered hierarchy of computer products. Each catalog object is labeled with the computer product it represents and with the attributes that it contains. Computer 102 contains two attributes: "price" and "color". Object inheritance is indicated by the plain arrows; search paths are indicated by the bold arrows. The search path is coincident with the inheritance. Laptop computer 104 and desktop computer 106 are both children of the object computer. A child inherits the attributes which are contained in the object of which it is a child. For example, laptop computer 104 is a child of the object computer and therefore inherits attributes 104-1 from computer 102. The inherited attributes are all attributes contained in computer 102, including the defined attributes 102-2 of computer 102, which are "price" and "color" and the inherited attributes 102-1 of computer 102, of which there are none. Attribute "color" is set equal to the value "black" in laptop computer 104. In addition, the defined attribute 104-2 of "battery-life" is defined in laptop computer 104. Likewise, desktop computer 106 has the inherited attributes "price" and "color", sets "color" equal to the value "white" and defines the attribute "height".

Model 1 108 is a child of the object laptop computer which represents a specific model of computer. It therefore inherits all attributes and values of laptop computer 104. In addition, Model 1 108 defines values for "price" and "battery-life", defines the attribute 108-2 "screentype" and assigns the value "backlit" to "screentype". Model 2 110 is also a child of the object laptop computer which represents a specific model of computer. It also inherits all attributes and values of laptop computer 104. In addition, Model 2 110 defines distinct values for "price" and "battery-life", defines the attribute 108-2 "CD type" and assigns the value "4x speed" to "CD type".

The relevance of the various attributes may be seen from an exemplary search through the hierarchy. The search begins at the top level, computer 102. The definition of attributes "price" and "color" are contained by computer 102. All children inherit these attributes. As shown by the inheritance arrows, all other objects are descendants of object computer. Therefore all other objects contain these attributes through inheritance. The search path arrows show that all other objects are in a search path from computer 102. Therefore, the attributes "price" and "color" are strongly relevant to computer 102, because they are contained by objects in all search paths leading from computer 102. All other attributes shown are weakly relevant to computer 102 because they are defined in descendant objects of computer 102 and thereby are not inherited by child objects in all inheritance paths from computer 102.

Now assume that the search has led to laptop computer 104. The attributes contained by laptop computer 104 are the inherited attributes "price" and "color" and the locally-defined attribute "battery-life". Because all lower-level objects inherit these attributes, they are contained by objects in all search paths leading from laptop computer 104 and are therefore strongly relevant to laptop computer 104. All other attributes in the objects which are descendants of laptop computer 104 are weakly relevant because they are defined in descendant objects leading from laptop computer 104. The attribute height, defined in desktop computer 106, is not contained by objects in any search path leading from laptop computer 104. Therefore, this attribute is irrelevant to laptop computer 104.

Carrying the search one level further, it is seen that for model 1 108, the attributes "price", "color", "battery-life" and "screentype" are strongly relevant, the attributes "height" and "CD type" are irrelevant and there are no weakly relevant attributes. Likewise, for model 2, 110, the attributes "price", "color", "battery-life" and "CD type" are strongly relevant, the attributes "height" and "screentype" are irrelevant and there are no weakly relevant attributes.

Figure 2:
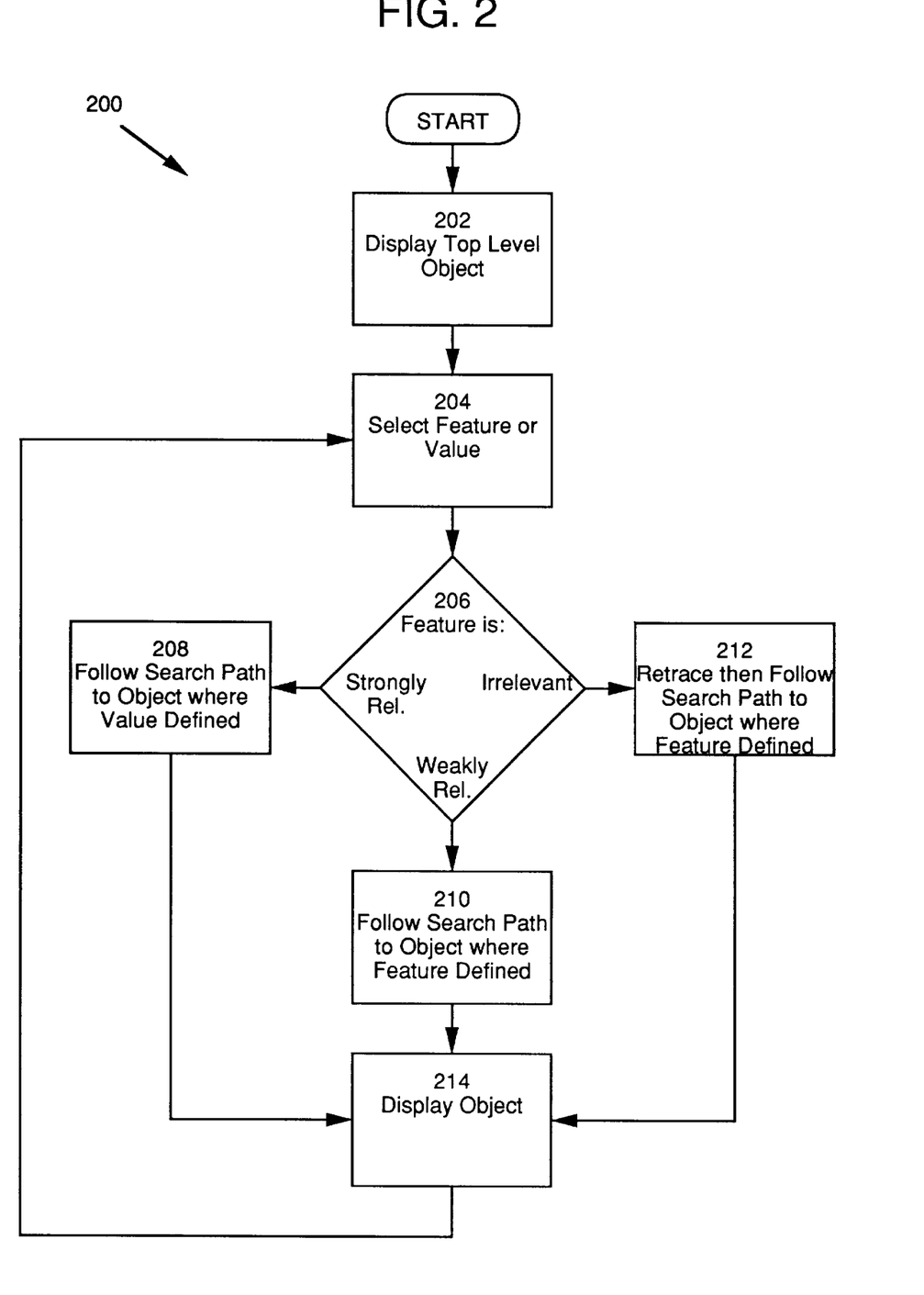
FIG. 2 is a flow diagram of a process 200, which performs feature relevant reasoning with the objects of FIG. 1.
Figure 3A:
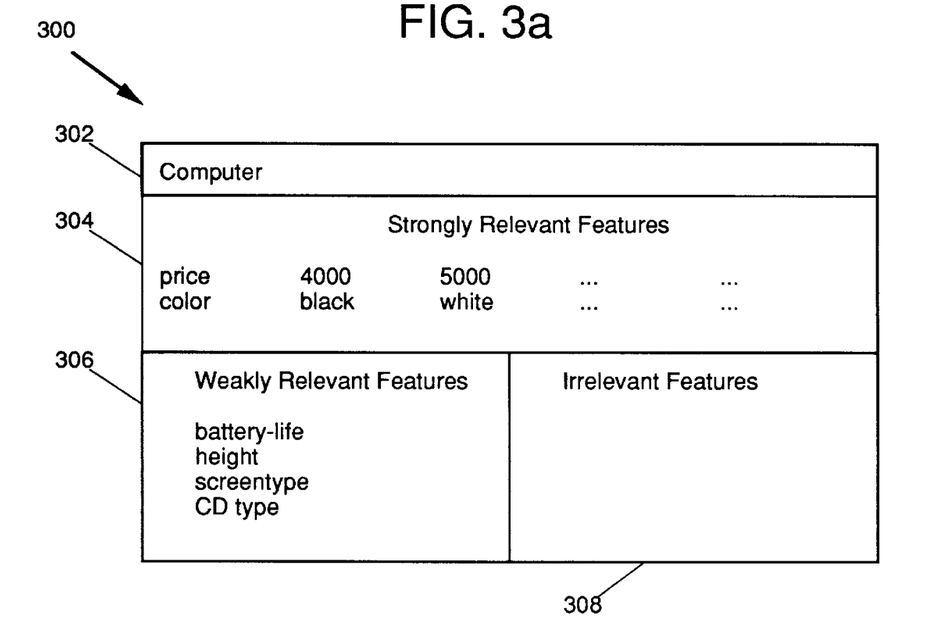
FIGS. 3a is an exemplary screen display 300 generated by process 200 of FIG. 2, displaying attributes of computer 102 of FIG. 1.

FIG. 2 is a flow diagram of a process 200, which performs feature relevance reasoning with the objects of FIG. 1. It is best viewed in conjunction with FIG. 1 and FIGS. 3*a–c*, which are screen displays generated by process 200. The process begins with step 200, in which the top level object is displayed. FIG. 3*a* is a screen display of the computer 102 of FIG. 1, which is the top level object of this example. Title field 302 displays the name of the object currently being displayed. Here, the object currently being displayed is computer 102. Strongly relevant feature field 304 displays the features which are strongly relevant to the object being displayed. Here, as discussed previously, the strongly relevant features are "price" and "color". In addition, the values of the strongly relevant features along the different search paths are displayed. Weakly relevant feature field 306 displays the features which are weakly relevant to the object being displayed. Here, the weakly relevant features are "battery-life", "height", "screentype" and "CD type". Irrelevant feature field 308 displays the features that are irrelevant to the object being displayed. At the top level, there are no irrelevant features.

Figure 3B:
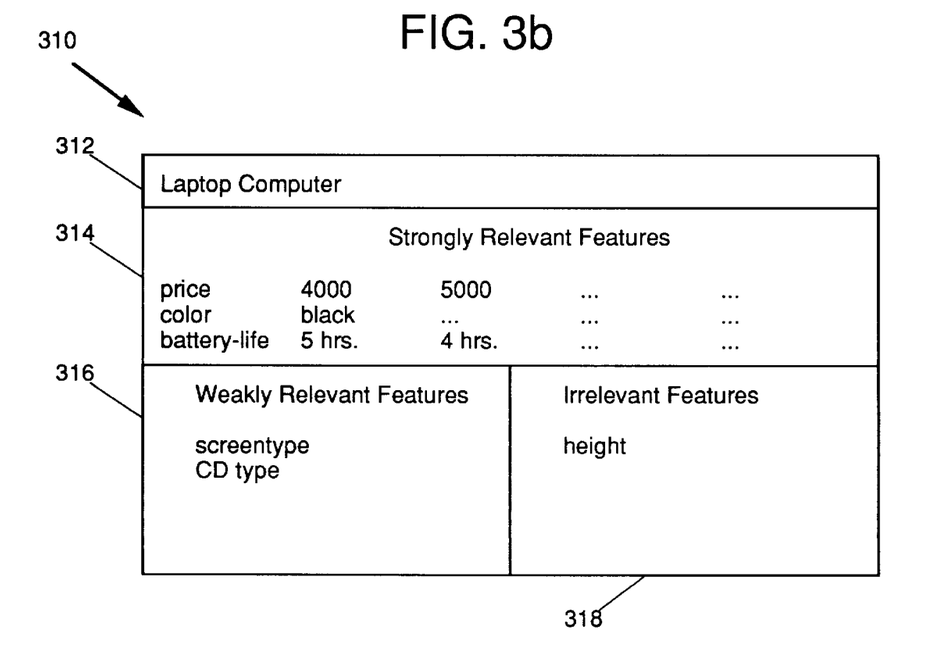
FIGS. 3b is an exemplary screen display 310 generated by process 200 of FIG. 2, displaying attributes of laptop computer 104 of FIG. 1.
Figure 3C:
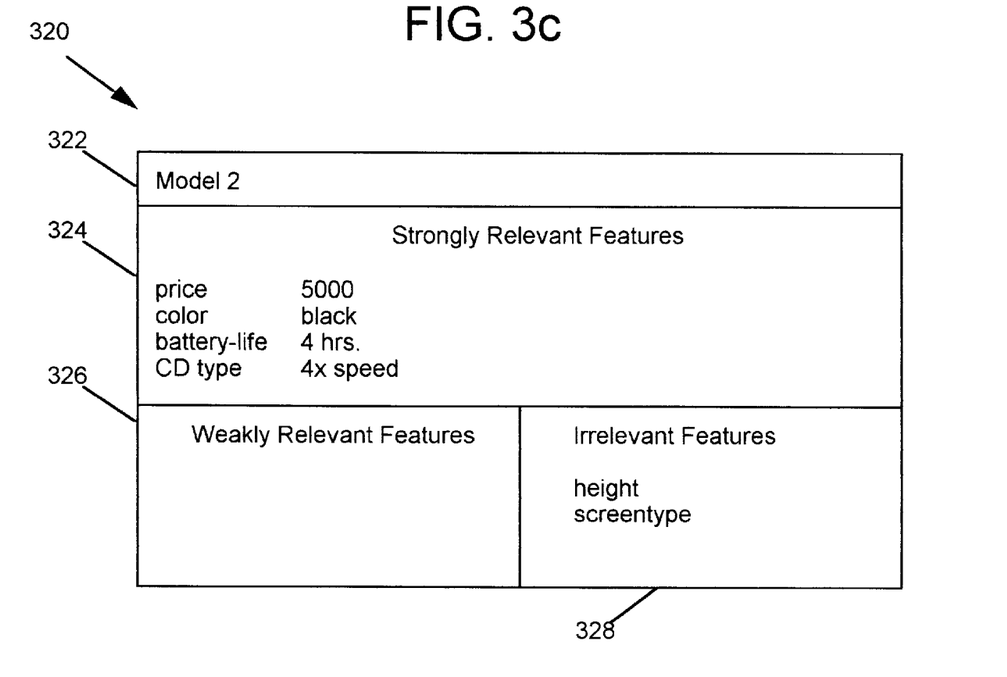
FIGS. 3c is an exemplary screen display 320 generated by process 200 of FIG. 2, displaying attributes of model 2 110 of FIG. 1.

In step 204 of FIG. 2, the user selects a weakly relevant or irrelevant feature or a strongly relevant feature value from among those displayed. In step 206, it is determined what type of feature was selected. If a value was selected in step 204, a strongly relevant feature was also selected because values are only displayed for strongly relevant features. The process goes to step 208, in which the search path is followed to the object where the value was assigned. Then, in step 214, this object is displayed. For example, selection of the "color" "black" in step 204 causes the search path to be followed, in step 208, to laptop computer 104, in which the value "black" is assigned to the feature "color". The screen display 310 of FIG. 3*b* is then displayed in step 214. Title field 312 displays the name of the object being displayed, "laptop computer". The "battery-life" feature is strongly relevant to laptop computer 104, so the "battery-life" feature, along with its values, is displayed in strongly relevant features field 314. The "screentype" and "CD type" features are weakly relevant to laptop computer 104, so they are displayed in weakly relevant features field 316. The "height" feature is not in any search path leading from laptop computer 104, so it is irrelevant and is displayed in irrelevant features field 318.

If a weakly relevant feature was selected in step 204, the process goes to step 210, in which the search path is followed to the object where the feature is defined. Then, in step 214, this object is displayed. For example, selection of the weakly relevant feature "battery-life" in step 204 causes the search path to be followed, in step 210, to laptop computer 104, in which the feature "battery-life" is defined. The screen display 310 of FIG. 3*b* is then displayed.

The process loops from step 214 back to step 204, in which the user may again select a feature or value from the currently displayed screen. For example, selection, from screen display 310 of FIG. 3*b*, of the value "5000" for "price", the value "4 hrs." for "battery-life", or the "CD type" weakly relevant feature causes screen display 320 of FIG. 3*c* to be displayed. Title field 322 displays the name of the object being displayed, "Model 2". The "CD type" feature is strongly relevant to model 2 108, so it, along with its value, "4x speed", is displayed in strongly relevant features field 324. The "screentype" feature is not in any search path leading from model 2 108, so it is now displayed in irrelevant features field 328. There are no weakly relevant features in this display.

Figure 3D:
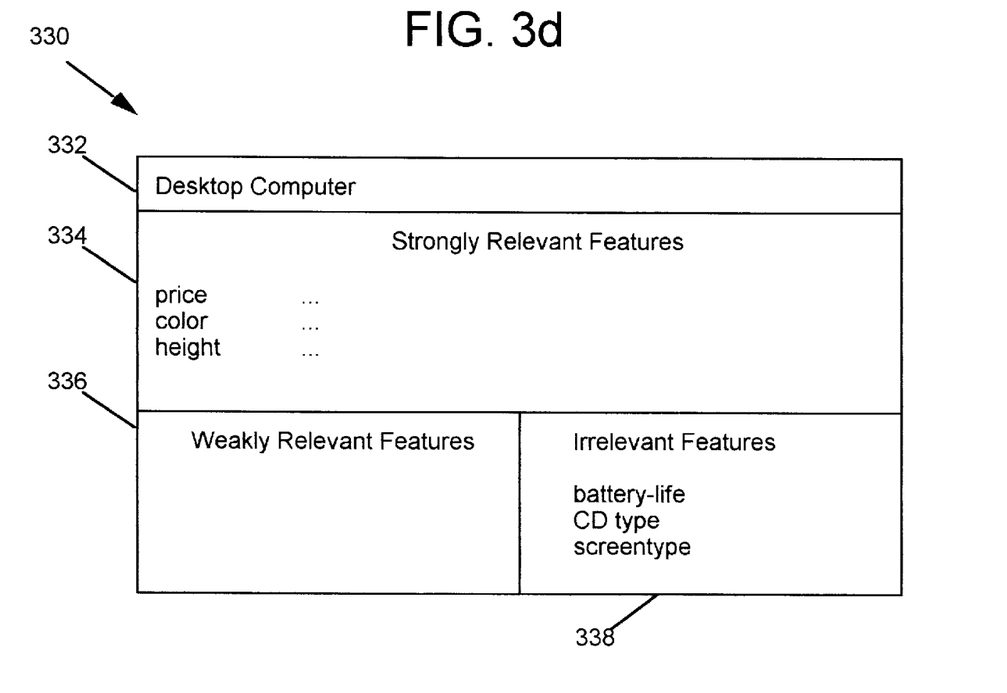
FIGS. 3d is an exemplary screen display 330 generated by process 200 of FIG. 2, displaying attributes of desktop computer 106 of FIG. 1.

When screen display 300 of FIG. 3a is displayed, no irrelevant features were available. When screen display 310 of FIG. 3b is displayed, irrelevant features are available. Selection, in step 204, of an irrelevant feature causes a search for the object in which the feature is defined. For example, irrelevant feature "height" is selected from screen display 310 of FIG. 3b. The search results in the desktop computer 106, where "height" is defined, and screen display 330 of FIG. 3d is displayed. Title field 332 displays the name of the object being displayed "desktop computer". The features "price", "color" and "height" are displayed in strongly relevant field 334 and the features "battery-life", "CD type" and "screentype" are displayed in irrelevant features field 338. There are no weakly relevant features in this display.

Figure 4:
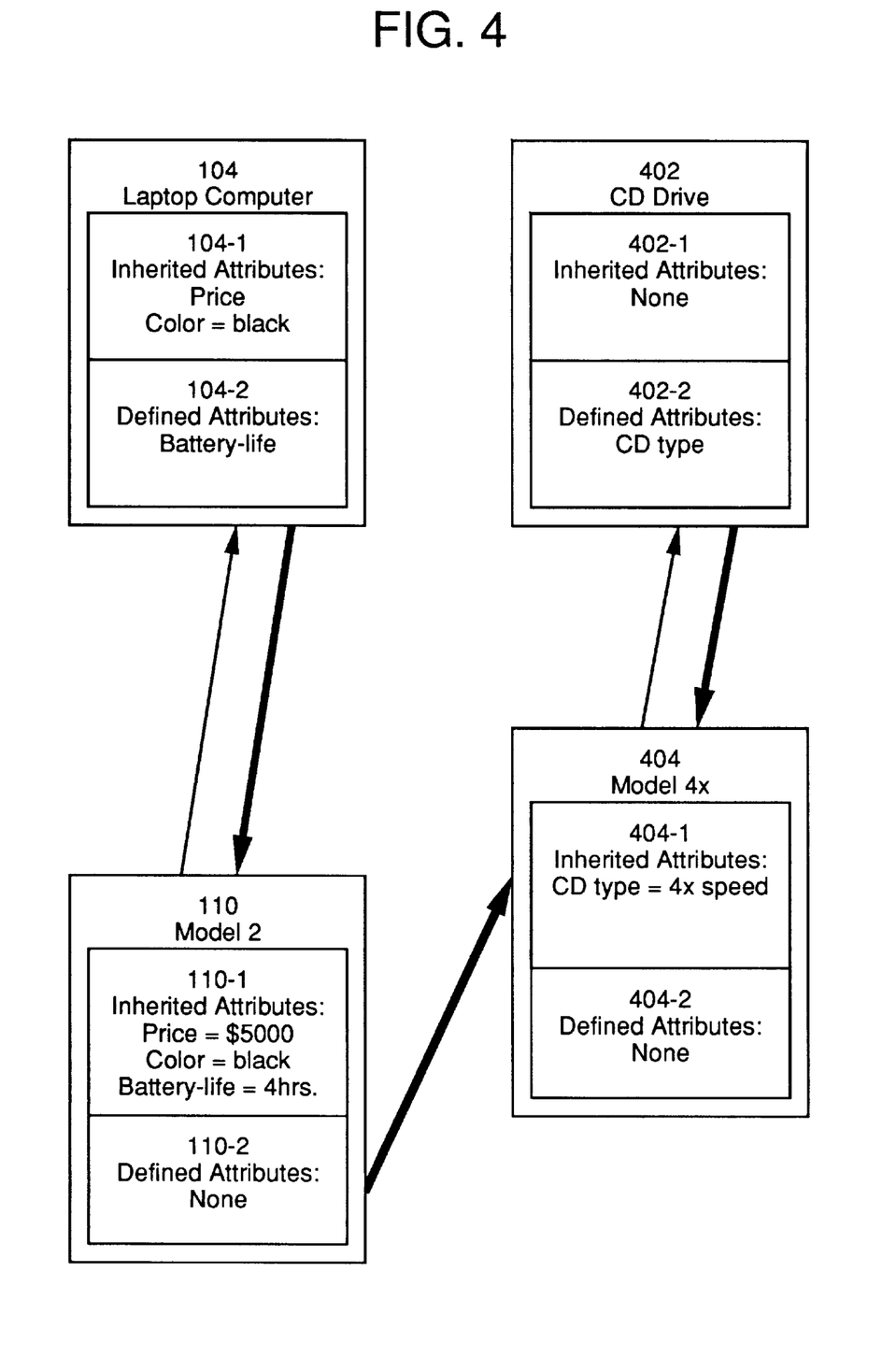
FIG. 4 is a block diagram of a portion of an exemplary catalog database, showing the relationship of database objects to form aggregate objects.

Feature relevance reasoning can be extended to aggregate objects as well. For example, in the previous examples, "CD type" was an attribute in the model 2 object. But a CD drive is in fact a separate object and may be represented as a separate object in the database. FIG. 4 is a block diagram of a portion of a catalog database, showing the CD drive represented as a separate object, CD drive 402. CD drive 402 defines the attribute "CD type". Model 4x 404 is a child of the class CD drive and so inherits the "CD type" attribute from CD drive 402. Model 4x 404 assigns the "CD type" attribute the value "4x speed". Model 2 110 has an aggregate relationship with model 4x 404. This allows the creation of aggregate objects, which can also be exploited with feature relevance reasoning. Model 4x 404 is not a child of the class model 2 and model 2 110 is not a child of the class model 4x. Therefore, neither object inherits any attributes from the other. However, because of the aggregate relationship of model 2 110 which leads to model 4x 404, the attributes of model 4x 404 are relevant to model 2 110. In fact, because model 4x 404 lies in an aggregation path leading from model 2 110, the attributes of model 4x 404 are strongly relevant to model 2 110. Any search path which includes model 2 110 also includes model 4x 404, so the attributes of model 4x 404 are relevant (either strongly or weakly) to all objects which have search paths which lead to or from model 2 110. Therefore, the database configuration of FIG. 3 results in screen displays which are similar to those of FIGS. 3a–c. However, this configuration allows the advantages of feature relevance reasoning to be extended to aggregate objects, without increasing the complexity of the user interface.

Figure 5:
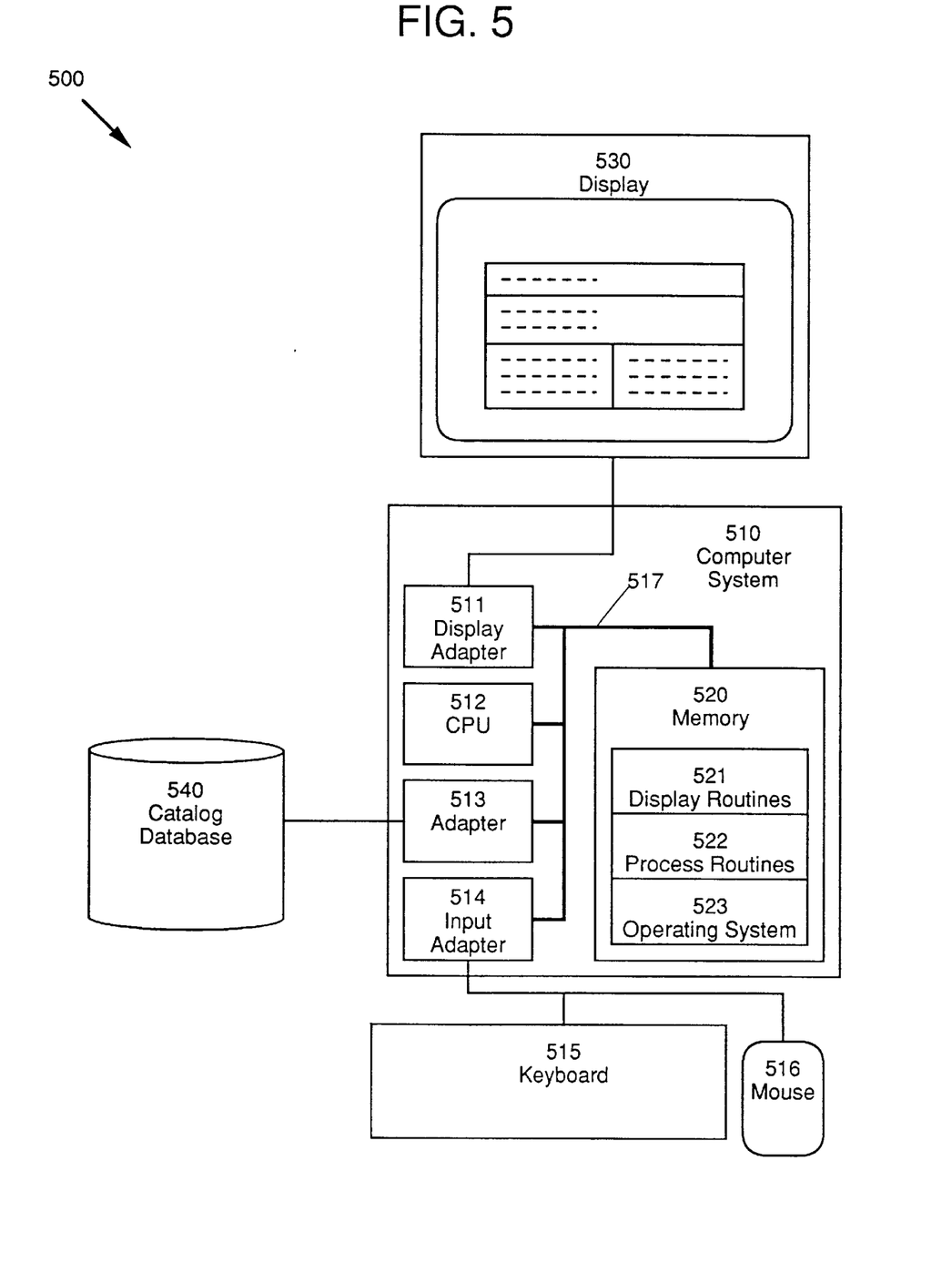
FIG. 5 is a block diagram of an electronic catalog system 500, which implements feature relevant reasoning, in accordance with the present invention.

FIG. 5 is a block diagram of an electronic catalog system 500, which implements feature relevance reasoning, in accordance with the present invention. System 500 includes display device 530, which displays the screen displays of FIGS. 3a–d. System 500 also includes computer system 510 which has a CPU 512, for executing program instructions and processing data, memory 520, for storing program instructions executed by and data processed by CPU 512, display adapter 511, for generating signals to drive display 530, input adapter 514, for interfacing input devices such as keyboard 515 and mouse 516 and adapter 513, for interfacing catalog database 540. Bus 517 allows signals and data to be communicated among the interconnected elements.

Memory 520 may include both volatile storage devices, such as, for example, random access memory (RAM) and non-volatile storage devices, such as, for example, hard disk, floppy disk, optical disk, electrically-alterable programmable read only memory, battery-backed up RAM, etc. Memory 520 is accessible to CPU 512 over bus 517 and includes operating system 523, process routines 522, which implement process 200 of FIG. 2 and display routines 521, which generate the screen displays of FIGS. 3a–d.

Catalog database 540 contains catalog database objects such as those shown in FIGS. 1 and 4. Catalog database is stored in a storage device of some kind. This storage device may be a separate device, as shown in FIG. 5, or it may be memory 520. If catalog database 540 is stored in a separate storage device, the storage device is interfaced to computer system 510 through adapter 513. Catalog database 540 may be stored in a local storage device, such as a CD ROM drive or tape drive or it may be stored in a networked storage device, such as a file server, on a local area network (LAN) or a wide area network (WAN), such as, for example, the Internet.

Although a specific embodiment of the present invention has been described, it will be understood by those of will in the art that there are other embodiments which are equivalent to the described embodiment. Accordingly, it is to be understood that the invention is not to be limited by the specific illustrated embodiment, but only by the scope of the appended claims.

What is claimed is:

1. In an electronic catalog having a plurality of catalog objects, each catalog object containing at least one attribute, at least some of the plurality of catalog objects each having at least one search path leading to at least one other catalog object, a method of accessing a catalog object, comprising the steps of:

displaying a first catalog object, attributes of the first catalog object, and attributes of other catalog objects in the electronic catalog;

accepting from a user a selection of an attribute;

following a search path from the first catalog object to a second catalog object, in which the selected attribute is defined; and displaying the second catalog object and attributes of other catalog objects in the electronic catalog;

wherein the step of displaying the first catalog object comprises the steps of:

displaying, as strongly relevant attributes, those attributes which are defined in the first catalog object and are inherited to all descendant catalog objects in any search path from the first catalog object;

displaying values assigned to strongly relevant attributes in catalog objects in any search path leading from the first catalog object;

displaying, as weakly relevant attributes, those attributes which are defined in at least one catalog object which is in any search path leading from the first catalog object; and displaying, as irrelevant attributes those attributes which are contained in no catalog objects which are in any search path leading from the first catalog object.

2. The method of claim 1, wherein the accepting step comprises the steps of:

accepting from the user a selection of a weakly relevant or irrelevant attribute; or accepting from the user a selection of a strongly relevant attribute and a value of the strongly relevant attribute.

3. The method of claim 2, wherein the following step comprises the steps of:

following a search path from the first catalog object to a second catalog object in which the selected attribute is defined, if the selected attribute is a weakly relevant attribute;

following a search path from the first catalog object to a second catalog object in which a value is assigned to the selected attribute, if the selected attribute is a strongly relevant attribute; and following a search path from the first catalog object to a third catalog object in which the selected attribute is a weakly relevant attribute and, from the third catalog object, searching a fourth catalog object in which the selected attribute is defined, if the selected attribute is an irrelevant attribute.

4. In a catalog database having a plurality of catalog objects, each catalog object containing an attribute, at least some of the plurality of catalog objects assigning a value to the attribute and at least some of the plurality of catalog objects each having at least one search path leading to at least one other catalog object; a method of accessing a catalog object, comprising the steps of:

displaying a first display screen having a first display field displaying strongly relevant attributes of a first catalog object and values of the strongly relevant attributes, a second display field displaying weakly relevant attributes of the first catalog object, and a third display field displaying irrelevant attributes of the first catalog object;

accepting from a user a selection of an attribute or a value;

following a search path from the first catalog object to a second catalog object, in which the selected attribute is defined; and displaying a second display screen having a first display field displaying strongly relevant attributes of a second catalog object and values of the strongly relevant attributes, a second display field displaying weakly relevant attributes of the second catalog object, and a third display field displaying irrelevant attributes of the second catalog object.

5. The method of claim 4, wherein the accepting step comprises the steps of:

accepting from the user a selection of a weakly relevant or irrelevant attribute; or accepting from the user a selection of a strongly relevant attribute and a value of the strongly relevant attribute.

6. The method of claim 4, wherein the following step comprises the steps of:

following a search path from the first catalog object to a second catalog object in which the selected attribute is defined, if the selected attribute is a weakly relevant attribute;

following a search path from the first catalog object to a second catalog object in which a value is assigned to the selected attribute, if the selected attribute is a strongly relevant attribute; and following a search path from the first catalog object to a third catalog object in which the selected attribute is a weakly relevant attribute and, from the third catalog object, searching for a fourth catalog object in which the selected attribute is defined, if the selected attribute is an irrelevant attribute.

7. A catalog database system comprising:

a catalog database having a plurality of catalog objects, each catalog object containing an attribute, at least some of the plurality of catalog objects each having at least one search path leading to at least one other catalog object;

a user input device accepting user input selections;

a memory device storing program instructions;

a display device; and a processor, coupled to the catalog database, the user input device, the memory device and the display device, executing the program instructions to perform the steps of:

displaying a first catalog object, attributes of the first catalog object, and attributes of other catalog objects in the catalog database;

accepting from a user input of a selection of an attribute;

following a search path from the first catalog object to a second catalog object, in which the selected attribute is defined; and displaying the second catalog object and attributes of other catalog objects in the electronic catalog;

wherein the step of displaying the first catalog object comprises the steps of:

displaying, as strongly relevant attributes, those attributes which are defined in the first catalog object and inherited to all catalog objects which are in any search path leading from the first catalog object;

displaying values assigned to strongly relevant attributes in catalog objects in any search path leading from the first catalog object;

displaying, as weakly relevant attributes, those attributes which are contained in at least one catalog object which is in any search path leading from the first catalog object; and displaying, as irrelevant attributes, those attributes which are contained in no catalog objects which are in any search path leading from the first catalog object.

8. The method of claim 7, wherein the accepting step comprises the steps of:

accepting from the user a selection of a weakly relevant or irrelevant attribute; or accepting from the user a selection of a strongly relevant attribute and a value of the strongly relevant attribute.

9. The method of claim 8, wherein the following step comprises the steps of:

following a search path from the first catalog object to a second catalog object in which the selected attribute is defined, if the selected attribute is a weakly relevant attribute;

following a search path from the first catalog object to a second catalog object in which a value is assigned to the selected attribute, if the selected attribute is a strongly relevant attribute; and following a search path from the first catalog object to a third catalog object in which the selected attribute is a weakly relevant attribute and following the search path from the third catalog object to a fourth catalog object in which the selected attribute is defined, if the selected attribute is an irrelevant attribute.

10. An electronic catalog system comprising:

a catalog database having a plurality of catalog objects, each catalog object containing at least one attribute, at least some of the plurality of catalog objects assigning a value to the attribute and at least some of the plurality of catalog objects each having at least one search path leading to at least one other catalog object;

a first screen display displaying a first catalog object, attributes of the first catalog object, and attributes of other catalog objects in the electronic catalog;

an input device accepting from a user a selection of an attribute or a value;

a searching device following a search path from the first catalog object to a second catalog object, in which the selected attribute is defined; and a second display screen displaying the second catalog object and attributes of other catalog objects in the electronic catalog;

wherein the first display screen comprises:

a first display field, displaying those attributes which are defined in the first catalog object and inherited to all catalog objects which are in any search path leading from the first catalog object and values assigned to those catalog objects;

a second display field, displaying those attributes which are contained in at least one catalog object which is in any search path leading from the first catalog object; and a third display field, displaying, those attributes which are contained in no catalog objects which are in any search path leading from the first catalog object.

11. The system of claim 10, wherein the searching device comprises:

a first searching unit following a search path from the first catalog object to a second catalog object in which a value is assigned to the selected attribute, if the selected attribute was displayed in the first display field;

a second searching unit following a search path from the first catalog object to a second catalog object in which the selected attribute is defined, if selected attribute was displayed in the second display field; and a third searching unit following a search path from the first catalog object to a third catalog object in which the selected attribute is in a search path leading from the third object a weakly relevant attribute and following the search path from the third catalog object to a fourth catalog object in which the selected attribute is defined, if the selected attribute was displayed in the third display field.

12. An electronic catalog system comprising:

a catalog database having a plurality of catalog objects, each catalog object containing an attribute, at least some of the plurality of catalog objects assigning a value to the attribute and at least some of the plurality of catalog objects each having at least one search path leading to at least one other catalog object;

a first screen display having three display fields, the first display field displaying strongly relevant attributes of a first catalog object and the attributes of other catalog objects in the electronic catalog;

an input device accepting from a user a selection of an attribute 6r a value;

a searching device following a search path from the first catalog object to a second catalog object, in which the selected attribute is defined; and a second display screen displaying the second catalog object;

wherein the first display screen comprises:

a first display field. disolaying those attributes which are defined in the first catalog object and inherited to all catalog objects which are in any search path leading from the first catalog object and values assigned to those catalog objects;

a second display field, displaying those attributes which are contained in at least one catalog object which is in any search path leading from the first catalog object; and a third display field, displaying, those attributes which are contained in no catalog objects which are in any search path leading from the first catalog object.

13. The system of claim 12, wherein the searching device comprises:

a first searching unit following a search path from the first catalog object to a second catalog object in which a value is assigned to the selected attribute, if the selected attribute was displayed in the first display field;

a second searching unit following a search path from the first catalog object to a second catalog object in which the selected attribute is defined, if selected attribute was displayed in the second display field; and a third searching unit following a search path from the first catalog object to a third catalog object in which the selected attribute is in a search path leading from the third catalog object a weakly relevant attribute and following the search path from the third catalog object to a fourth catalog object in which the selected attribute is defined, if the selected attribute was displayed in the third display field.

* * * * *